Figure 1:
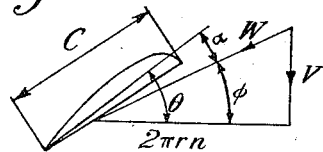

Jan. 13, 1948.  H. L. MILNER  2,434,506
PROPELLER
Filed March 25, 1944  2 Sheets-Sheet 1

Inventor
Harry L. Milner
by Wilkinson & Mawhinney
Attorneys

Jan. 13, 1948.   H. L. MILNER   2,434,506
PROPELLER
Filed March 25, 1944   2 Sheets-Sheet 2

INVENTOR
HARRY L. MILNER
by Wilkinson & Mawhinney
ATTORNEYS

Patented Jan. 13, 1948

2,434,506

UNITED STATES PATENT OFFICE 2,434,506

PROPELLER

Harry Lawley Milner, Cheltenham, England, assignor to Rotol Limited, Gloucester, England, a British company Application March 25, 1944, Serial No. 528,131
In Great Britain March 19, 1943

Section 1, Public Law 690, August 8, 1946
Patent expires March 19, 1963

1 Claim. (Cl. 170—159)

In the manufacture of a propeller or airscrew, great care has hitherto been taken to ensure that it is statically balanced to such a degree of accuracy that when in use it shall not give rise to objectionable or dangerous vibration. Since, however, it is impossible to make each blade perfect, and manufacturing tolerances have to be allowed, differences are found to exist between different blades.

In the specification of my United States patent application No. 464,086, filed October 31, 1942, I have described a method of manufacturing screw-propellers whereby a satisfactory degree of aerodynamic balance can be achieved, and any tendency of the propeller to give rise to vibration arising from a lack of such balance was reduced. Described in general terms, that method consisted in adjusting the pitch-settings of the blades of a propeller by a predetermined small amount so as to produce the required result. In carrying out that method certain calculations were involved and for practical purposes at that date, some approximations could be made and some factors could be neglected whilst still obtaining results that were effective. Thus, for example, it was permissible to neglect variations in the torque-forces between different blades arising from fortuitous differences in their shape and dimensions, one reason being that I found it was satisfactory to correct any differences in the thrust-moments of different blades and that such corrections nearly always gave at least a partial correction for the variations in torque-forces which accompanied them. It was also permissible in making the calculations aforesaid to neglect the forward speed of the aircraft, taking account only of the rotational speed of the propeller.

The enhanced performance of aircraft now available as regards speed, and the increased power now absorbed by a propeller have rendered of appreciable importance the two factors which were previously negligible, and the object of the present invention is to provide a more improved method of manufacturing propellers.

This invention accordingly comprises a method of determining the angle at which a propeller-blade should be set with reference to the basic pitch angle in order that the torque-force of the blade may approximate so closely to the datum torque-force as to provide a satisfactory degree of aerodynamic balance when the blade is assembled in a propeller at its appropriate angle with another blade or other blades each set at its appropriate angle, which method consists in (a) measuring by physical means the variations in form and dimensions of the blade from those of a datum blade, (b) estimating from such measurement the difference in torque-force of the blade from the datum torque-force, and (c) calculating therefrom the said first-mentioned angle.

The datum blade above referred to may be a hypothetical blade deemed to have been manufactured exactly in accordance with the design drawings, or may be an actual master blade made to correspond as closely as possible to such drawings, or it may be a suitable normal blade arbitrarily adopted as a standard of comparison.

The datum torque-force of any blade is the torque-force of a datum blade which has been set to the basic pitch angle, and the basic pitch angle is the angle at which a datum blade should be set when being assembled in the propeller to suit the particular conditions under which it is required to operate.

The step (b) of the method above set forth, namely assessing the differences in torque-force of the blade from those of a datum blade, may be effected in accordance with the simple blade element theory using the same approximations as described in my prior specification aforesaid, or a more accurate assessment of the torque-force can be made by the method hereinafter set forth in detail.

According to another feature of this invention, step (a) aforesaid consists in determining at each of a number of stations along the blade the variation in the angular position of the zero-lift line from that of a datum blade, as for example by means of the gauge described in the specification of my United States patent application No. 464,087, which issued on June 25, 1946, as Patent No. 2,402,567 in the same manner as described in my United States patent application No. 464,086.

According to another feature of this invention, a method of determining the angle at which an airscrew blade should be set in order to provide a satisfactory degree of aerodynamic balance when the blade is assembled in an airscrew consists in (a) measuring by physical means the variations in form and dimensions of the blade from those of a datum blade, (b) estimating from such measurements the difference both in torque-force and thrust-moment of the blade from those of a datum blade, (c) calculating therefrom the angle to which the blade should be set to correct either of them, and (d) when such angles of correction differ, selecting either of them or a suitable intermediate value, appropriate to the operating conditions of the propeller. The said selection will usually be made empirically since it will depend to some extent upon factors which cannot be predetermined, such as the structural design of the machine in which the propeller is installed.

According to yet another feature of the invention, it comprises a method of making a propeller which consists in manufacturing the blades within suitable tolerances, estimating the angle at which each blade should be set with reference to the basic pitch-angle by any of the methods above set forth, and assembling each blade at its appropriate angle so that the propeller shall have a satisfactory degree of aerodynamic balance.

When an assessment of the difference in thrust-moment from that of a datum blade is made, the method used may be that set forth in my prior specification aforesaid, or may be the more accurate method hereinafter set forth in which account is taken of the forward speed of the machine. The estimation of the torque-force and of the thrust-moment, and the calculation of the pitch-setting of the blade by which the blade should be adjusted will now be explained in detail and for this purpose reference will be made to the diagrams Figures 1 to 7 of the drawings accompanying this specification.

Figure 2:
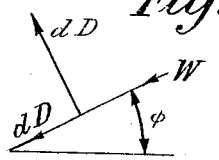
Figure 3:
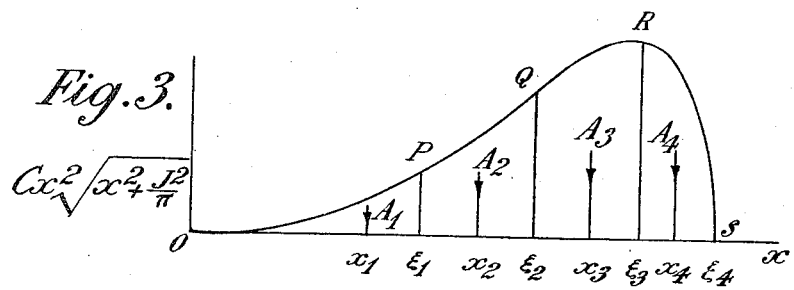
Figure 4:
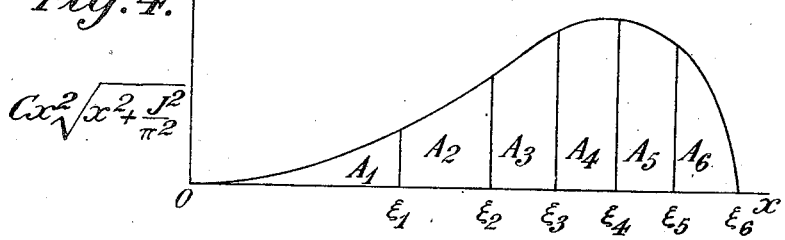
Figure 5:
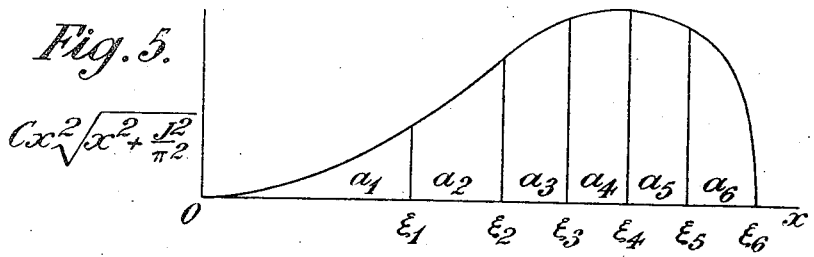
Figure 6:
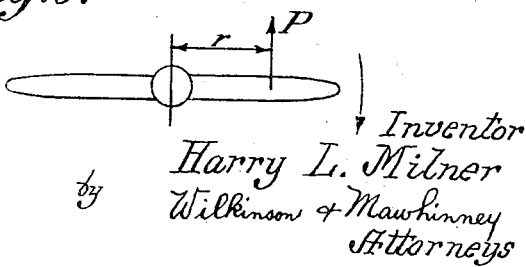
Figure 7:
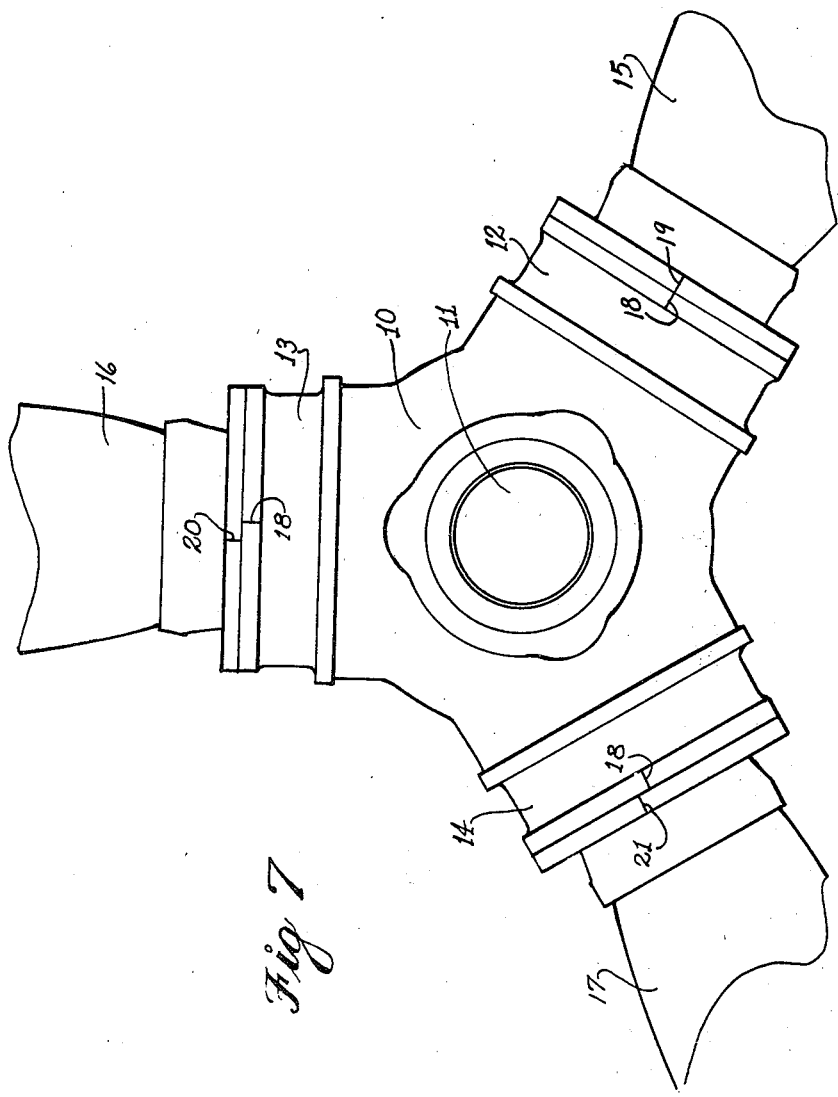

In these drawings:

Figure 1 represents the cross section of a blade element and the components of velocity, Figure 2 represents the corresponding components of force of the blade, Figures 3, 4 and 5 illustrate the processes used in the present invention in the evaluation of $\theta \Delta \tau$, Figure 6 illustrates a two-bladed airscrew on one blade of which air forces exert an excess torque, and Figure 7 illustrates diagrammatically a three-bladed airscrew in accordance with the present invention.

Consider in the first place the effect of thrust distribution. If $T$ is the total thrust of a blade and $r$ is the radius of the center of thrust, a condition for smooth running of an airscrew is that the moment of thrust should be the same for all the component blades, or $$Tr = \text{constant}$$

In the simple blade element theory of airscrews the blades are regarded as aerofoils under the influence of a resultant effective air velocity which changes in magnitude and direction along the blade.

Consider the forces acting on a blade element of radius $r$ and length $\alpha r$ Figure 1 represents the cross section of a blade element and the components of velocity. Figure 2 represents the corresponding components of force of the blade.

The symbols in these diagrams have the following significance:

$n$ = angular velocity of the airscrew
$V$ = forward speed of flight
$W$ = resultant air velocity relative to the blade element
$\alpha$ = angle between the zero-lift line of the section and direction of $W$ (angle of incidence)
$\theta$ = angle of zero-lift line relative to the plane of rotation
$\phi = \theta - \alpha$
$dL$ = lift force on the element
$dD$ = Drag force on the element
$C$ = chord of the section The forces on the element are related to the quantities represented in Figure 1 by the following equations:

$$dL = \tfrac{1}{2}\rho W^2 C_L C dr$$
$$dD = \tfrac{1}{2}\rho W^2 C_D C dr$$

where $C_L$ and $C_D$ are lift and drag coefficients of the blade section and $\rho$ is the air density.

The axial thrust $dT$ of the element is given by the components of these forces parallel to the axis of rotation.

$$dT = \tfrac{1}{2}\rho C W^2 (C_L \cos\phi - C_D \sin\phi) dr$$
$$= \tfrac{1}{2}\rho C (C_L \cos\phi - C_D \sin\phi) 4\pi^2 r^2 n^2 \sec^2\phi \, dr \quad (1)$$

Similarly the torque $dQ$ due to the element is the moment of the component forces about the axis of rotation.

$$dQ = \tfrac{1}{2}\rho C W^2 (C_L \sin\phi + C_D \cos\phi) r dr$$
$$= \tfrac{1}{2}\rho C (C_L \sin\phi + C_D \cos\phi) 4\pi^2 r^3 n^2 \sec^2\phi \, dr \quad (2)$$

Now $C_D$ is a small quantity compared with $C_L$ and, over the range of angles of incidence associated with an efficient airscrew, is substantially constant.

Also, $C_L = m\alpha$ where $m$ is some constant.

Hence, neglecting terms containing $C_D$ and substituting for $C_L$, the moment of the thrust component about a plane containing the axis of rotation and perpendicular to the blade axis is $$dM = r dT = 2\pi^2 n^2 \rho m C \alpha r^3 \sec\phi \, dr \quad (3)$$

and similarly $$dQ = 2\pi^2 n^2 \rho m C \alpha r^2 \tan\phi \sec\phi \, dr \quad (4)$$

If $R$ denotes the tip-radius of the airscrew and $$J = \frac{V}{2nR}$$

by introducing $$x = \frac{r}{R}$$

Equations 3 and 4 may be written $$dM = 2\pi^2 n^2 \rho m R^4 C \alpha x^3 \sqrt{1 + \frac{V^2}{(2\pi x R n)^2}} dx \quad (5)$$

$$= K_1 C \alpha x^2 \sqrt{x^2 + \frac{J^2}{\pi^2}} dx$$

$$dQ = K_1 C \alpha x^2 \sqrt{x^2 + \frac{J^2}{\pi^2}} \left(\frac{V}{2\pi x R n}\right) dx$$

$$= K_2 C \alpha \sqrt{x^2 + \frac{J^2}{\pi^2}} dx \quad (6)$$

where $K_1$ and $K_2$ are constants for the blade.

The change in thrust-moment due to a change $\delta\alpha$ in the angle of incidence extending over a blade-segment bounded by radii $\xi_1$, and $\xi_2$ is given by $$\delta M = K_1 \delta\alpha \int_{\xi_1}^{\xi_2} C x^2 \sqrt{x^2 + \frac{J^2}{\pi^2}} dx$$

Imagine the blade divided into segments bounded by sections at radii $\xi_1, \xi_2, \xi_3 \ldots 1$ in which the angular errors of the zero-lift line are $\delta\alpha_1$, $\delta\alpha_2$, $\delta\alpha_3$, etc., the excess of thrust-moment over that of the datum blade will be, with due regard to sign, $$\delta M = K_1 \delta\alpha_1 \int_0^{\xi_1} C x^2 \sqrt{x^2 + \frac{J^2}{\pi^2}} dx + K_1 \delta\alpha_2 \int_{\xi_1}^{\xi_2} C x^2 \sqrt{x^2 + \frac{J^2}{\pi^2}} dx + \ldots \quad (7)$$

But the same change in thrust-moment could be brought about by rotating the datum blade through some angle $\Delta\theta_T$ say. Conversely the combined errors $\delta\alpha_1$, $\delta\alpha_2$, $\delta\alpha_3$ ... can be nullified by reducing the pitch of the actual blade by $\Delta\theta_T$. Hence, $$\delta M = K_1 \Delta\theta_T \int_0^1 Cx^2 \sqrt{x^2 + \frac{J^2}{\pi^2}} dx \qquad (8)$$

From Equations 7 and 8 we get $$\Delta\theta_T = \frac{\delta\alpha_1 \int_0^{\xi_1} Cx^2 \sqrt{x^2 + \frac{J^2}{\pi^2}} dx + \delta\alpha_2 \int_{\xi_1}^{\xi_2} Cx^2 \sqrt{x^2 + \frac{J^2}{\pi^2}} dx + \cdots}{\int_0^1 Cx^2 \sqrt{x^2 + \frac{J^2}{\pi^2}} dx} \qquad (9)$$

When the errors $\delta\alpha_1$, $\delta\alpha_2$, $\delta\alpha_3$ are known, at a number of given radii $x_1$, $x_2$, $x_3$ ... etc., the evaluation of $\Delta\theta_T$ is most conveniently carried out by plotting the curve $$Cx^2 \sqrt{x^2 + \frac{J^2}{\pi^2}}$$

against $x$, determining the area enclosed by the curve and the $x$ axis, then subdividing this area into segmental areas corresponding to the stations $x_1$, $x_2$, $x_3$, etc.

The process is illustrated in Figure 3 in which the curve OPQRS represents the function $$Cx^2 \sqrt{x^2 + \frac{J^2}{\pi^2}}$$

plotted against radius. For example, suppose there are four stations $x_1$, $x_2$, $x_3$, $x_4$ at which the errors $\delta\alpha$ are measured and that $\xi_1$, $\xi_2$, $\xi_3$, $\xi_4$ define the radii of the segments containing the respective errors. The ordinates corresponding to $\xi_1$, $\xi_2$, etc., intersect the curve at P, Q, R and S. Denoting by $A_0$ the total area under the curve and by $A_1$, $A_2$, $A_3$ and $A_4$ the segmental areas under OP, PQ, QR and RS, equation 9 is then equivalent to:

$$\Delta\theta_T = \frac{A_1 \delta\alpha_1 + A_2 \delta\alpha_2 + A_3 \delta\alpha_3 + A_4 \delta\alpha_4}{A_0}$$

The various errors are thus "weighted" by factors $A_1$, $A_2$, $A_3$, etc., according to position along the blade.

This obvious graphical interpretation of Equation 9 has been introduced because of its bearing on an important application of the problem about to be described.

In the preceding discussion the observed stations $x_1$, $x_2$, $x_3$, etc., and the segments bounded by $\xi_1$, $\xi_2$, $\xi_3$, etc., have arbitrary positions and do not necessarily represent the best division of the blade. For given values of $x_1$, $x_2$, $x_3$ the weight factors will clearly depend upon the boundary positions $\xi_1$, $\xi_2$, $\xi_3$, etc., and will in general vary within fairly wide limits. Thus observation stations which are heavily weighted will carry an undue responsibility. The degree of variation of the weight-factor obtainable by an arbitrary choice of section radii is given in the following table calculated for an actual blade:

| Section radius | .333 | .500 | .667 | .833 | .917 | .958 |
|---|---|---|---|---|---|---|
| Weight factor | .038 | .120 | .271 | .299 | .155 | .118 |

The variation of the weight-factor in this case is considerable and in view of the fact that the angular errors of the several stations are capable of determination with uniform accuracy such a variation is undesirable. Further the final result will be influenced by any errors of observation and an error of given magnitude will be of greater importance if it occurs at radius .833 than at any other station. This disadvantage can be overcome by choosing a system of stations which carry equal weight factors. A method of achieving this result will be clear from the following description which, however, for reasons not immediately relevant envisages a system in which the inboard segment has only one half the weight-factor of the remaining segments.

The number of representative sections will be taken as six. As in the first method, construct the curve of $$Cx^2 \sqrt{x^2 + \frac{J^2}{\pi^2}}$$

against $x$ and measure the enclosed area $A_0$. The total area has then to be divided into six parts. Denoting these areas by $A_1$, $A_2$, $A_3$, $A_4$, $A_5$ and $A_6$ the required condition is $$A_1 = \frac{1}{11} A_0$$

$$A_2 = A_3 = A_4 = A_5 = A_6 = \frac{2}{11} A_0$$

This process has been carried out in Figure 4, on which the boundaries of the areas so found are marked.

It now remains to locate the positions of the sections which are most representative of the elementary areas $A_1$, $A_2$, $A_3$, etc. To this end plot a curve of $$Cx \sqrt{x^2 + \frac{J^2}{\pi^2}}$$

against $x$ as shown in Figure 5 and erect ordinates at the area boundaries of Figure 4. The area enclosed by the curve of Figure 5 and the $x$ axis will thus be divided into six unequal parts. Denote these by $a_1$, $a_2$, $a_3$, $a_4$, $a_5$, $a_6$.

The ordinates of Figures 4 and 5 are proportional to the thrust-moment per unit length and thrust per unit length of blade respectively. Also the total area of Figure 4 is proportional to the total thrust-moment about the blade root. Similarly the areas of Figure 5 are proportional to the thrusts of the elements of length into which the blade has now been divided.

Thus the moment of any elementary area of Figure 5 about the origin must be equal to the corresponding area of Figure 4. It follows that if $\bar{x}$ is the centroid of an elementary area of Figure 5 then $$\bar{x}_1 a_1 = A_1 \therefore \bar{x}_1 = A_1/a_1$$

and similarly $$\bar{x}_2 = A_2/a_2, \ \bar{x}_3 = A_3/a_3, \ \text{etc.}$$

$x_1, x_2 \ldots x_6$ are thus the radii of the representative sections for the corresponding areas $A_1, A_2 \ldots A_6$.

The weight-factor appropriate to any blade segment is given by $A_n/A_0$ consequently the six required weights are:

$$W_1 = \frac{A_1}{A_0} = \frac{1}{11}$$

$$W_2 = W_3 = W_4 = W_5 = W_6 = \frac{2}{11}$$

The sections at which the angular errors are to be determined have the calculated radii $x_1, x_2, x_3$, etc., and these will, in general, not coincide with the standard sections specified for manufacturing purposes.

The following advantages are secured by choosing the observed sections in the prescribed manner:

(1) The observed sections being of substantially equal importance, errors of observation will tend to cancel out whereas if the usual drawing sections are employed the weight-factors become very unequal and put an undue responsibility on one or two measured sections.

(2) By adopting sections which are not specified in the manufacturer's drawing and in consequence are not subject to close inspection or control, there is greater probability of discovering aerodynamic discrepancies than would otherwise be the case.

So far, the method of weighting the blade section errors has been founded on approximate airscrew theory which, however, despite the approximations adopted and because the final results are obtained as a quotient of two quantities containing similar approximations, yields results of sufficient accuracy for most practical applications. There is no difficulty in attaining even greater accuracy should this be desired. A convenient process in this case would be to plot a thrust grading curve for the blade in accordance with more elaborate airscrew theory for the desired operating conditions (this corresponds to Figure 5) and then construct a moment grading curve by multiplying each ordinate of the first curve by its radius to obtain a curve corresponding to Figure 4 and applying the same process to the new curves as was employed with Figures 4 and 5.

For perfect aerodynamic balance of an airscrew the total thrust-moment of the several blades should be zero and the torque-forces about the axis of rotation should be equal.

A method of obtaining thrust-moment balance has already been dealt with and it now remains to examine the effects of unequal blade-torques. For this purpose a two-bladed airscrew will be considered as this exemplifies the process for any number of blades. Let the air forces on one blade exert an excess torque of value $Q_0$ which may be represented by a force P acting at a radius $r$, Figure 6.

This will result in an unbalanced force P acting laterally on the propeller shaft and rotating with it. For smooth running we should have $P=0$.

Taking the tip-radius of the blade as unity, the torque exerted by a blade-element at radius $x$ and of length $dx$ is given by Equation 6 above, that is to say:

$$dQ = K_2 C\alpha \sqrt{x^2 + \frac{J^2}{\pi^2}} dx \qquad (6)$$

Applying a similar process to that used in discussing the thrust-moment and adopting the same nomenclature, the angular change in blade-angle required to make $P=0$ is given by $$\Delta\theta_Q = \frac{\delta\alpha_1 \int_0^{\xi_1} C\sqrt{x^2 + \frac{J^2}{\pi^2}} dx + \delta\alpha_2 \int_{\xi_1}^{\xi_2} C\sqrt{x^2 + \frac{J^2}{\pi^2}} dx + \cdots}{\int_0^1 C\sqrt{x^2 + \frac{J^2}{\pi^2}} dx} \qquad (10)$$

The graphical treatment corresponding to Equation 10 is obvious. The angle $\Delta\theta_Q$ will not, in general, be the same as $\Delta\theta_T$. Hence it is not always possible to eliminate completely and simultaneously the thrust-moment unbalance and the torque unbalance. A choice must therefore be made between the two correction processes and this will be guided by the desired characteristics of the installation.

Thus one might correct for thrust or for torque or for any combination of the two according to the relative importance of the disturbing influences. Fortunately, correction for unbalanced thrust will, with certain unimportant exceptions, also reduce the corresponding unbalanced torque and vice versa.

The variation with radius of the torque and thrust weight-factors $W_Q$ and $W_T$ of a typical blade for two values of J and are given in the following table.

| Section radius | J=2 | | J=4 | |
|---|---|---|---|---|
| | $W_Q$ | $W_T$ | $W_Q$ | $W_T$ |
| .333 | .126 | .061 | .146 | .073 |
| .500 | .189 | .142 | .205 | .157 |
| .667 | .274 | .275 | .274 | .280 |
| .833 | .229 | .279 | .216 | .267 |
| .917 | .104 | .133 | .095 | .129 |
| .958 | .078 | .105 | .064 | .094 |

An examination of the above table shows that the relative importance of aerodynamic errors at the respective blade sections changes with the value of J, or in other words according to the forward speed of the aircraft, and that the root and tip sections are affected more than the intermediate sections.

It will also be noted that the weight-factors for torque- and thrust-moment, whilst of the same order at intermediate radii, for the same value of J are appreciably different at root and tip.

It will further be clear that only a fortuitous disposition of aerodynamic errors along a given blade will result in a simultaneous elimination of both thrust and torque effects and in general one may expect only to be able to eliminate one of these effects with a consequent reduction in the value of the other.

Consider an uncorrected two bladed propeller in which one blade exerts more thrust and torque than the other. The thrust-moment will give rise to a couple having its axis in the plane of rotation and perpendicular to the blade axis. The resultant torque of the two blades will give rise to a force acting in the direction of the axis of the couple and both the couple and force rotate with the propeller thus giving rise to a resultant periodic bending moment about any plane in the airframe parallel to the propeller disc. The magnitude of this bending moment obviously depends upon the distance between the plane and the propeller disc. The response to the disturbing resultant will depend upon the dynamic characteristics of the aeroplane and may be more pronounced in one aircraft than in another. Similar effects will be observed in a propeller having more than two blades.

These vibrational disturbances will be minimised if not entirely eliminated by correcting the propeller blades in accordance with the foregoing formulae for either thrust-moment or torque or some optimum combination of the two having regard to the particular aircraft to which the propeller is fitted.

The airscrew illustrated in Figure 7 comprises a hub 10 having a central opening 11 by which it is mounted at its driving shaft, and is provided with three sockets 12, 13, 14 which receive respectively blades 15, 16, 17. The root ends of the blades are cylindrical and are adjustable in their respective sockets. On each socket there is provided a datum mark 18, and the root end of each blade has marked on it an index mark 19, 20, 21 respectively. If a blade is found to have the desired aerodynamical characteristics, its index mark is set in alignment with the datum mark on the socket as shown in the case of the blade 15. If the herein described method of assessing the aerodynamical characteristics of the blade shows that a correction must be applied to this setting, the index mark is displaced from the datum by the desired amount. The blade 16 is shown as adjusted in one direction, and the blade 17 is shown as adjusted in the opposite direction—for positive and negative corrections. It will be appreciated that the pitch angles at which the blades are thus set would not necessarily be different, since each is derived as the result of distinct measurement and computation.

It will be appreciated that the foregoing analysis and the method of manufacturing propellers, whilst described in relation to airscrews and blades thereof, is equally applicable to marine screw-propellers, the only difference being the substitution of hydrodynamic forces and effects for aerodynamic forces and effects.

I claim:

An airscrew comprising blades each assessed as to its aerodynamic qualities by the steps of (a) measuring by a convenient empirical method the direction relatively to a fixed datum of the zero-lift line of the section of a master blade at a number of stations along the blade, (b) measuring by the same empirical method any differences in direction of the corresponding lines of the blade being assessed, (c) determining the torque force produced by such differences, and (d) calculating the departure from the zero-lift setting of the master blade which would produce an equal torque force, and a hub to which said blades are assembled and adjusted to different pitch angles such as will compensate for said differences in torque force.

HARRY LAWLEY MILNER.

REFERENCES CITED

The following references are of record in the file of this patent:

UNITED STATES PATENTS

| Number | Name | Date |
|---|---|---|
| 1,693,450 | McCauley | Nov. 27, 1928 |
| 1,769,767 | Caldwell | July 1, 1936 |
| 2,219,303 | Fraser | Oct. 29, 1940 |
| 2,336,303 | Schubert | Dec. 7, 1943 |
| 2,343,383 | Martin | Mar. 7, 1944 |